(12) United States Patent
Masato

(10) Patent No.: US 12,095,954 B2
(45) Date of Patent: Sep. 17, 2024

(54) SYSTEM COMPRISING MULTI-TENANT CLOUD SERVER AND ELECTRONIC EQUIPMENT, NON-TRANSITORY COMPUTER-READABLE STORAGE MEDIUM STORING SERVER PROGRAM, AND NON-TRANSITORY COMPUTER-READABLE STORAGE MEDIUM STORING EQUIPMENT PROGRAM

(71) Applicant: KYOCERA Document Solutions Inc., Osaka (JP)

(72) Inventor: Hirota Masato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/088,953

(22) Filed: Dec. 27, 2022

(65) Prior Publication Data

US 2023/0224413 A1 Jul. 13, 2023

(30) Foreign Application Priority Data

Jan. 7, 2022 (JP) ................................ 2022-001453

(51) Int. Cl.
- *H04N 1/00* (2006.01)
- *G06F 21/31* (2013.01)
- *G06F 21/60* (2013.01)
- *H04L 9/40* (2022.01)
- *H04N 1/44* (2006.01)

(52) U.S. Cl.
CPC ......... *H04N 1/00244* (2013.01); *G06F 21/31* (2013.01); *G06F 21/608* (2013.01); *H04L 63/083* (2013.01); *H04N 1/00344* (2013.01); *H04N 1/4413* (2013.01); *H04N 2201/0094* (2013.01)

(58) Field of Classification Search
CPC ... G06F 21/31; H04L 63/083; H04N 1/00344; H04N 1/4413
See application file for complete search history.

(56) References Cited

U.S. PATENT DOCUMENTS

| | | | |
|---|---|---|---|
| 2008/0134295 A1* | 6/2008 | Bailey | G06F 21/30 726/4 |
| 2015/0036167 A1* | 2/2015 | Naitoh | G06F 3/1239 358/1.14 |
| 2016/0335679 A1* | 11/2016 | Kshirsagar | G06Q 30/0269 |

FOREIGN PATENT DOCUMENTS

JP   2020-181573   11/2020

\* cited by examiner

*Primary Examiner* — Peter K Huntsinger
(74) *Attorney, Agent, or Firm* — LEX IP MEISTER, PLLC

(57) ABSTRACT

A system wherein a cloud server assigns a customer site as a tenant with an organization number of the customer site and notifies a customer administrator of the organization number; an MFP notifies the cloud server of the organization number entered by the customer administrator and queries the cloud server about a subdirectory name of the customer site; the cloud server notifies the MFP of the subdirectory name associated with the notified organization number; the MFP notifies the customer site accessed using the notified subdirectory name of a serial number of the MFP; and the customer site manages the notified serial number.

6 Claims, 17 Drawing Sheets

22a EQUIPMENT MANAGEMENT DATABASE

| SERIAL NUMBER | IP ADDRESS | HOST NAME | . . . |
|---|---|---|---|
| ZRC9300001 | 10.183.82.110 | KM8902C2 | . . . |
| . | . | . | . |
| . | . | . | . |
| . | . | . | . |

FIG. 3

24 ORGANIZATION MANAGEMENT DATABASE

| ORGANIZATION NAME | SUBDIRECTORY NAME | ORGANIZATION NUMBER | ADMINISTRATOR EMAIL ADDRESS | ADMINISTRATOR PIN |
|---|---|---|---|---|
| OrganizationA | OrganizationA | 245132 | aaa@bbb.co.jp | 1369 |
| OrganizationB | OrganizationB | 351645 | ccc@ddd.co.jp | 7316 |
| OrganizationC | OrganizationC | 946132 | eee@fff.co.jp | 8221 |
| OrganizationD | OrganizationD | 285421 | ggg@hhh.co.jp | 9012 |
| ... | ... | ... | ... | ... |

FIG. 6

24 ORGANIZATION MANAGEMENT DATABASE

| ORGANIZATION NAME | SUBDIRECTORY NAME | ORGANIZATION NUMBER | ADMINISTRATOR EMAIL ADDRESS | ADMINISTRATOR PIN |
|---|---|---|---|---|
| OrganizationA | OrganizationA | 245132 | aaa@bbb.co.jp | 1369 |
| OrganizationB | OrganizationB | 351645 | ccc@ddd.co.jp | 7316 |
| OrganizationC | OrganizationC | 946132 | eee@fff.co.jp | 8221 |
| OrganizationD | OrganizationD | 285421 | ggg@hhh.co.jp | |

FIG. 15

324 ORGANIZATION MANAGEMENT DATABASE

324a TABLE

| ORGANIZATION NAME | SUBDIRECTORY NAME | ADMINISTRATOR EMAIL ADDRESS | ADMINISTRATOR PIN |
|---|---|---|---|
| OrganizationA | OrganizationA | aaa@bbb.co.jp | 1369 |
| OrganizationB | OrganizationB | ccc@ddd.co.jp | 7316 |
| OrganizationC | OrganizationC | eee@fff.co.jp | 8221 |
| OrganizationD | OrganizationD | ggg@hhh.co.jp | 9012 |
| . | . | . | . |
| . | . | . | . |
| . | . | . | . |

324b RESERVATION NUMBER TABLE

| RESERVATION NUMBER | ORGANIZATION NAME | EXPIRATION DATE |
|---|---|---|
| 24513 | OrganizationA | 2021/08/24 10:36 |
| 35164 | OrganizationB | 2021/08/25 15:27 |
| 94613 | OrganizationC | 2021/08/23 09:01 |
| 28542 | OrganizationD | 2021/08/26 11:12 |
| . | . | . |
| . | . | . |
| . | . | . |

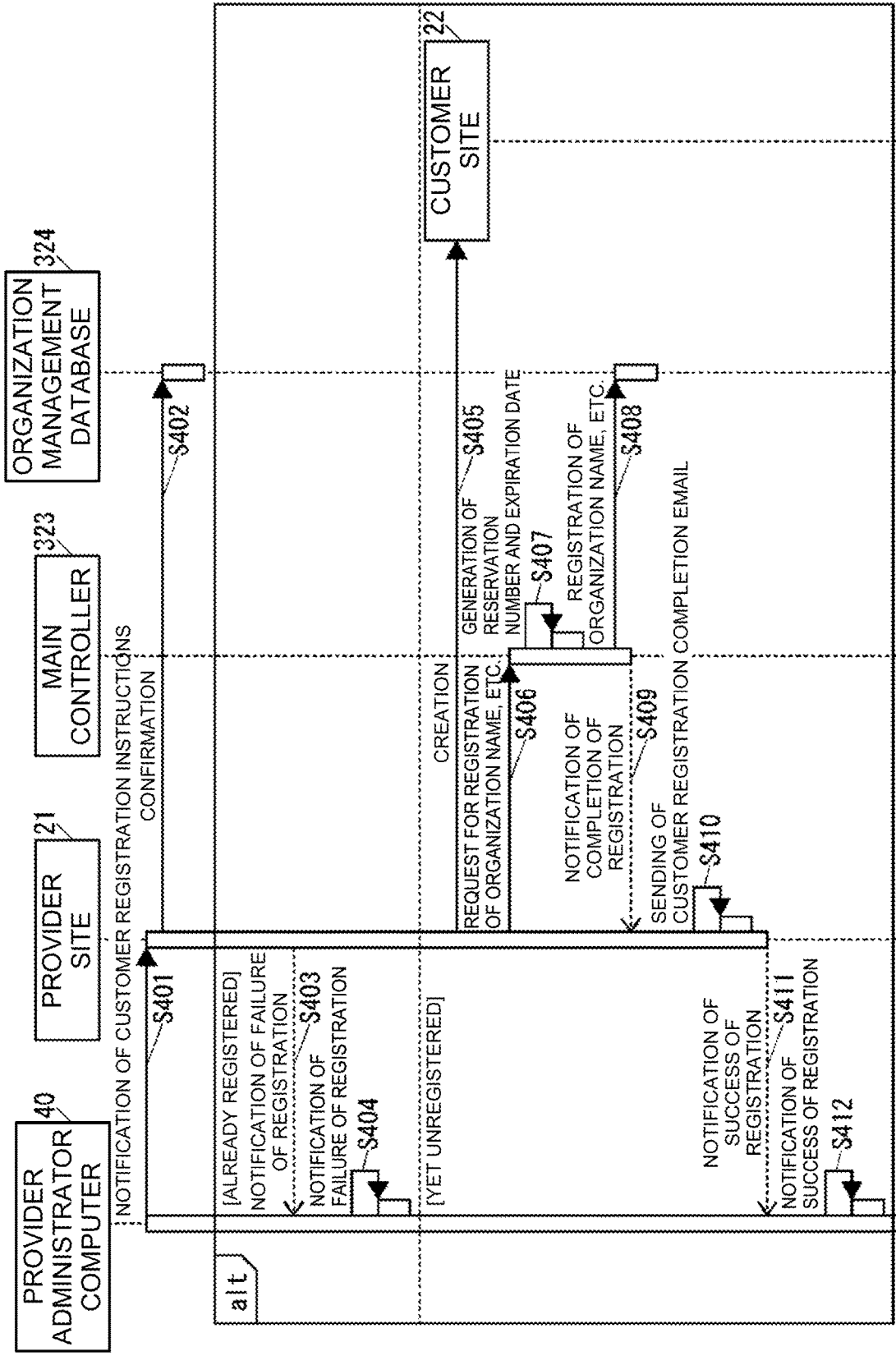

SYSTEM COMPRISING MULTI-TENANT CLOUD SERVER AND ELECTRONIC EQUIPMENT, NON-TRANSITORY COMPUTER-READABLE STORAGE MEDIUM STORING SERVER PROGRAM, AND NON-TRANSITORY COMPUTER-READABLE STORAGE MEDIUM STORING EQUIPMENT PROGRAM

INCORPORATION BY REFERENCE

This application is based upon, and claims the benefit of priority from, corresponding Japanese Patent Application No. 2022-001453 filed in the Japan Patent Office on Jan. 7, 2022, the entire contents of which are incorporated herein by reference.

BACKGROUND

Field of the Invention

The present disclosure relates to a system in a multi-tenant cloud service, a non-transitory computer-readable storage medium storing a server program, and a non-transitory computer-readable storage medium storing an equipment program.

Description of Related Art

A distributed-type image forming system for pull printing, which does not require a server, has been known.

SUMMARY

A system of the present disclosure is provided with a multi-tenant cloud server and electronic equipment that uses a tenant of the cloud server. In the system, the cloud server assigns the tenant with tenant identification information as identification data of the tenant, and notifies a user of the tenant identification information that has been assigned; the electronic equipment notifies the cloud server of the tenant identification information entered by the user, and thereby queries the cloud server about access information used to access the tenant; the cloud server notifies the electronic equipment of the access information associated with the tenant identification information notified by the electronic equipment; the electronic equipment accesses the tenant with the use of the access information notified by the cloud server, and notifies the tenant that has been accessed of equipment identification information as identification data of the electronic equipment; and the tenant manages the equipment identification information notified by the electronic equipment.

A non-transitory computer-readable storage medium having stored thereon a server program, of the present disclosure, has a configuration in which the server program is executed by a multi-tenant cloud server. The server program includes: having the cloud server assign a tenant of the cloud server with tenant identification information as identification data of the tenant; having the cloud server notify a user of the tenant identification information that has been assigned by the cloud server; having the cloud server notify electronic equipment using the tenant of access information used to access the tenant, the access information being associated with the tenant identification information notified to the cloud server by the electronic equipment; and having the tenant manage the equipment identification information notified to the tenant by the electronic equipment.

A non-transitory computer-readable storage medium having stored thereon an equipment program, of the present disclosure, has a configuration in which the equipment program is executed by electronic equipment that uses a tenant of a multi-tenant cloud server. The equipment program includes: having the electronic equipment notify the cloud server of tenant identification information as identification data of the tenant, which has been entered by the user to the electronic equipment, and thereby having the electronic equipment query the cloud server about access information used to access the tenant; and having the electronic equipment access the tenant with the use of the access information notified by the cloud server to the electronic equipment, and having the electronic equipment notify the tenant that has been accessed by the electronic equipment of equipment identification information as identification data of the electronic equipment.

BRIEF DESCRIPTION OF THE DRAWINGS

FIG. 3 depicts an example of an organization management database depicted in FIG. 1;

FIG. 6 depicts an example of the organization management database of FIG. 3 immediately after a customer is registered;

FIG. 15 depicts an example of an organization management database depicted in FIG. 14;

FIG. 16 is a sequence diagram depicting the operation of the system of FIG. 14 when registering a customer;

DETAILED DESCRIPTION

The embodiments of the present disclosure will be described below with reference to the drawings.

First Embodiment

First, the configuration of a system according to the first embodiment of the present disclosure is described.

Figure 1:
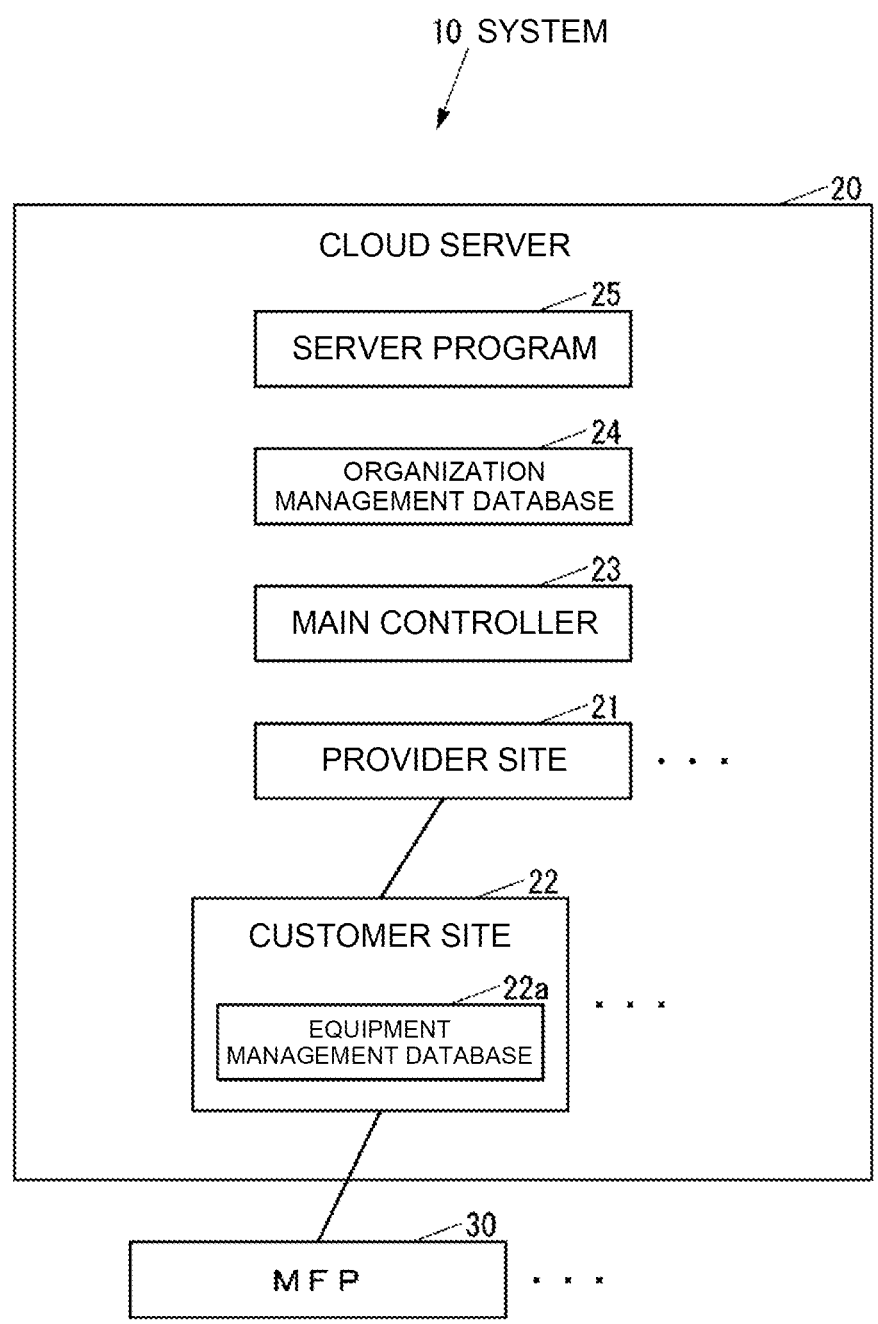
FIG. 1 is a block diagram of a system according to the first embodiment of the present disclosure.

FIG. 1 is a block diagram of the system 10 according to this embodiment.

As depicted in FIG. 1, the system 10 that realizes a multi-tenant cloud service is provided with a multi-tenant cloud server 20 and a multifunction peripheral (MFP) 30 as an electronic equipment managed by the cloud server 20. In addition to the MFP 30, the system 10 may be provided with one or more MFPs similar in configuration to the MFP 30. System 10 is located in, e.g., Japan. A system having a configuration similar to the system 10 may also be located in each specific region, such as U.S., Europe, etc.

The cloud server 20 may be implemented by a single computer or multiple computers.

Tenants of the cloud server 20 include a provider site 21 as a tenant for a provider who provides the MFP, and a customer site 22 as a tenant for a customer to which the MFP is provided. In addition to the provider site 21, the cloud server 20 may include one or more provider sites similar in configuration to the provider site 21. In the cloud server 20, the provider site exists for each provider. In addition to the customer site 22, the cloud server 20 may include one or more customer sites similar in configuration to the customer site 22. In the cloud server 20, the customer site exists for each customer.

The provider can manage multiple customers. The provider site manages the customer site of the customer managed by the provider corresponding to the provider site. An administrator belongs to the provider. The administrator belonging to the provider is hereinafter referred to as a "provider administrator".

In the system 10, each customer is managed by only one of providers. The customer can manage multiple MFPs. The customer site manages the MFP managed by the customer corresponding to the customer site. A user of the MFP belongs the customer. An administrator belongs to the customer. The administrator belonging to the customer is hereinafter referred to as a "customer administrator".

In the system 10, each MFP is managed by only one of customers.

The customer site 22 has an equipment management database 22a that indicates the MFP managed by the customer site 22.

Figure 2:
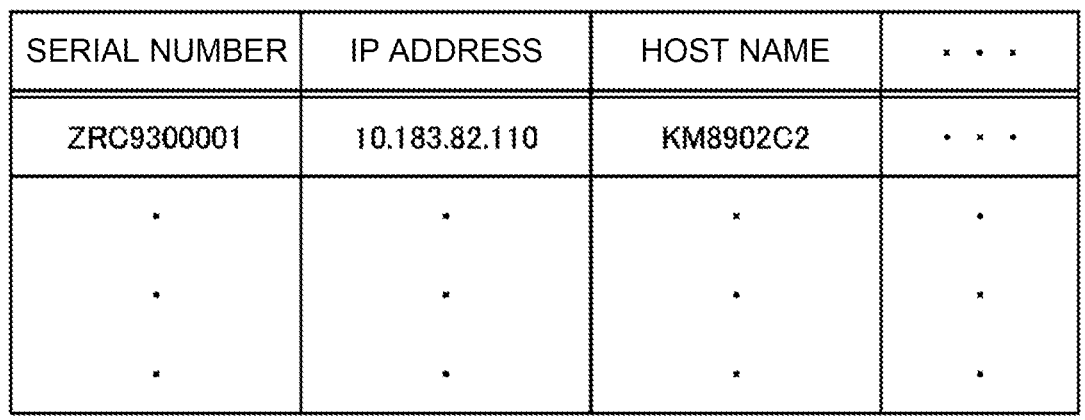
FIG. 2 depicts an example of an equipment management database depicted in FIG. 1.

FIG. 2 depicts an example of the equipment management database 22a.

As depicted in FIG. 2, the equipment management database 22a indicates, for each MFP, e.g., a serial number, an internet protocol (IP) address, a host name, etc., of the MFP managed by the customer site 22.

The serial number is denoted by, e.g., a ten-digit alphanumeric character. The serial number of the MFP is unique and different for each MFP. The serial number is the identification information of the MFP, and constitutes equipment identification information.

The cloud server 20 depicted in FIG. 1 can provide a cloud-based pull-printing function (hereinafter referred to as a "cloud printing") and a cloud-based scanning function (hereinafter referred to as a "cloud scanning"). The cloud printing is a function wherein a user of the MFP saves print job data from a PC or other computer (not depicted) to a customer site of a customer to which the user belongs and thereafter uses the MFP associated with the said customer site to execute printing based on the print job data. The cloud scanning is a function wherein an MFP user uploads a document scanned by the MFP to a customer site associated with the said MFP. The document uploaded to the customer site through the cloud scanning can be downloaded by a PC or other computer (not depicted).

The cloud server 20 includes a main controller 23 that executes a control such as searching a customer site where the MFP is registered.

The cloud server 20 stores an organization management database 24 that manages a customer.

FIG. 3 depicts an example of the organization management database 24.

As depicted in FIG. 3, the organization management database 24 manages, for each customer, an organization name indicating the name of the customer, a subdirectory name as information for access to the customer site, an organization number indicating the customer's identification number, an administrator email address indicating the email address of the customer administrator, and an administrator PIN indicating the personal identification number (PIN) of the customer administrator.

Each of the organization name and the subdirectory name is denoted by, e.g., a character string of between 1 and 64 characters. The types of characters that can be included in the organization name and the subdirectory name are, e.g., alphanumeric characters and certain symbols. All organization names registered in the organization management database 24 are unique and different from each other. All subdirectory names registered in the organization management database 24 are unique and different from each other.

The organization number is denoted by, e.g., a six-digit number. All organization numbers registered in the organization management database 24 are unique and different from each other. The organization number is the identification information of the customer site as a tenant, and constitutes tenant identification information.

The administrator PIN is denoted by, e.g., a four-digit number. The administrator PIN is a PIN to enter an administrator mode in an equipment application (described below) of the MFP.

As depicted in FIG. 1, the cloud server 20 stores a server program 25. The cloud server 20 executes the server program 25 and thereby achieves operations described below.

Figure 4:
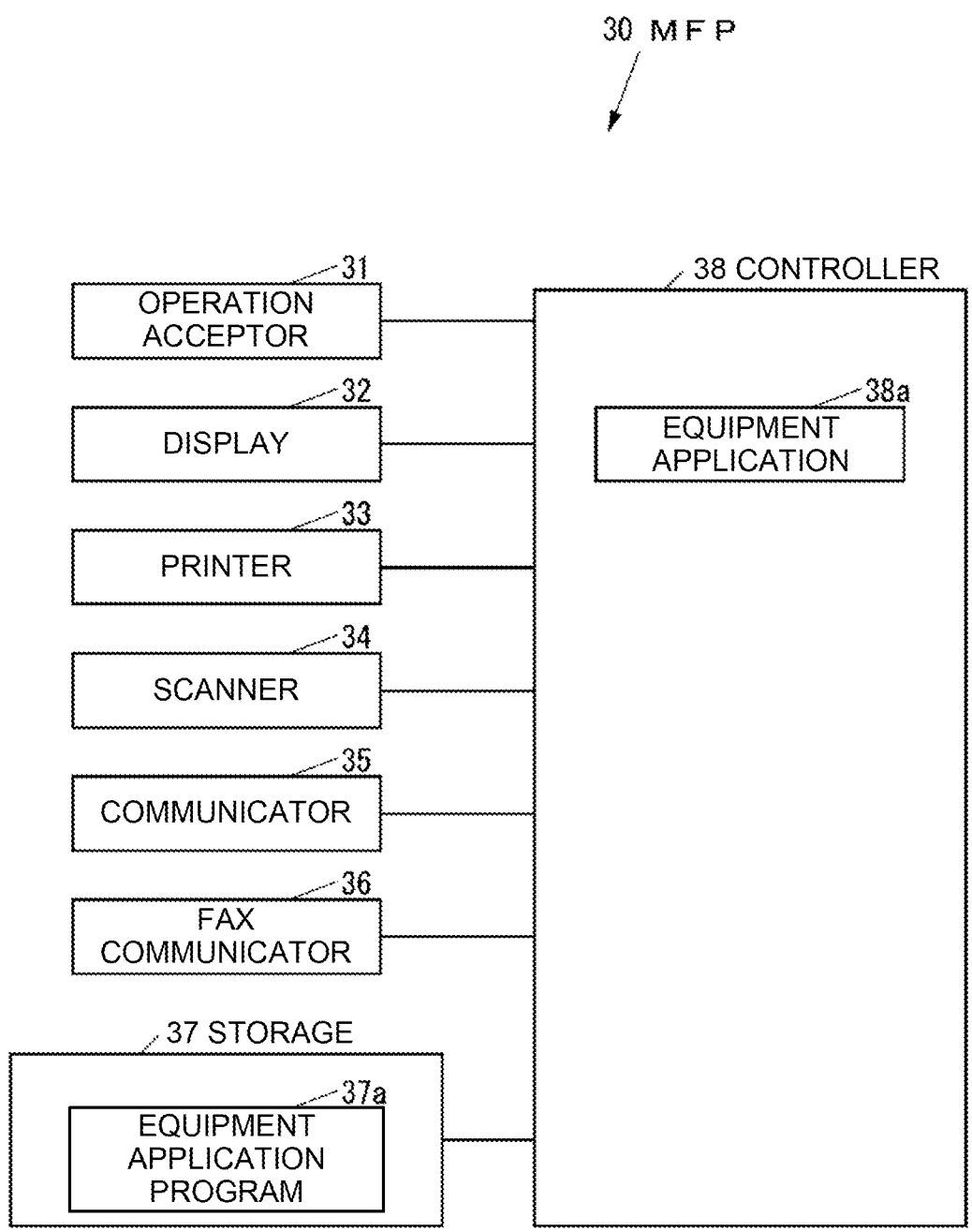
FIG. 4 is a block diagram of an MFP depicted in FIG. 1.

FIG. 4 is a block diagram of the MFP 30.

As depicted in FIG. 4, the MFP 30 is equipped with an operation acceptor 31 that is an operating device such as a button, an integrated circuit (IC) card reader, etc., through which various operations are input; a display 32 that is a display device such as a liquid crystal display (LCD) used for displaying various types of information; a printer 33 that is a printing device used for printing images on paper or other recording media;

a scanner 34 that is a reading device used for reading images from a manuscript; a communicator 35 that is a communication device used for communicating with an external device via a network such as a local area network (LAN), Internet, etc., or directly by wired or wireless means without going through a network; a fax communicator 36 that is a fax device used for performing facsimile communication with an external facsimile device (not depicted) via a communication line such as a public telephone line; a storage 37 that is a non-volatile storage device such as a semiconductor memory, a hard disk drive (HDD), etc., used for storing various types of information; and a controller 38 that controls the MFP 30 in its entirety.

The storage 37 stores, as a program for equipment, an equipment application program 37a that is an application program to realize the cloud printing and the cloud scanning. The equipment application program 37a may be installed, e.g., in the MFP 30 during a manufacturing stage of the MFP 30; or additionally in the MFP 30 from an external storage medium such as a compact disk (CD), a digital versatile disk (DVD), a universal serial bus (USB) memory, etc.; or additionally in the MFP 30 from the network.

The controller 38 includes, e.g., a central processing unit (CPU), a read only memory (ROM) that stores a program and various data, and a random access memory (RAM) that is a memory used as the work area of the CPU. The CPU executes the program stored in the storage 37 or the ROM.

The controller 38 enables an equipment application 38a by executing the equipment application program 37a stored in the storage 37. In other words, the MFP 30 can use the customer site 22 of the cloud server 20 through the cloud printing and the cloud scanning.

The customer administrator can enter the administrator mode in the equipment app 38a by entering the administrator PIN on the equipment app 38a. In the administrator mode of the equipment app 38a, various network settings can be performed, such as a proxy server setting, a domain setting for the cloud server 20, a subdirectory setting for the customer site 22, etc.

The operation of the system 10 will be described below.

First, the operation of the system 10 in order to register a customer is described.

Figure 5:
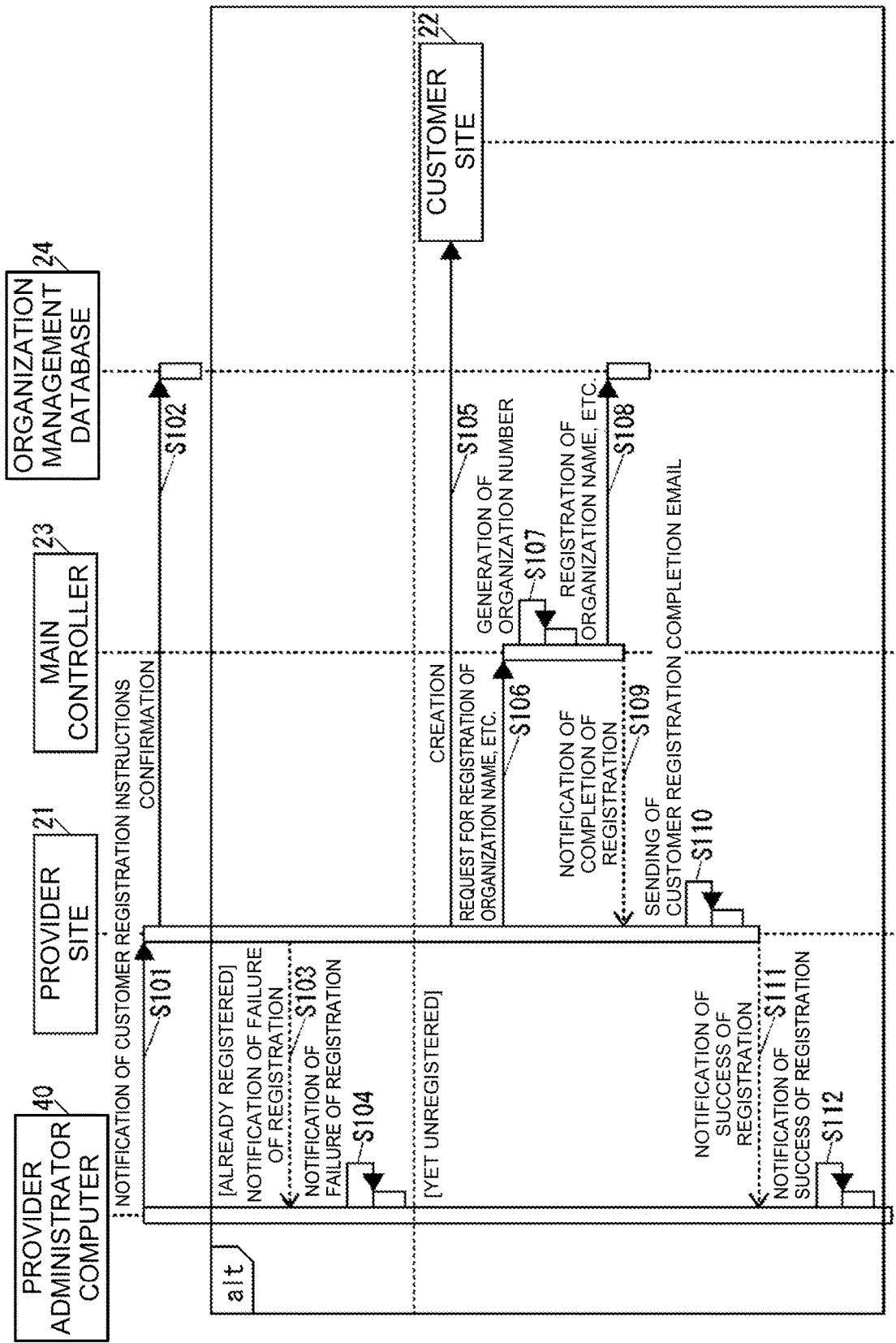
FIG. 5 is a sequence diagram depicting the operation of the system of FIG. 1 when registering a customer.

FIG. 5 is a sequence diagram of the operation of the system 10 when registering a customer.

In the following description of the operation depicted in FIG. 5, the provider site 21 is illustrated as an example of a provider site of a provider to which the provider administrator belongs, and the customer site 22 is illustrated as an example of a customer site of a customer who is registered by the said provider administrator.

As depicted in FIG. 5, the provider administrator may use a computer (hereinafter referred to as a "provider administrator computer") 40 to access the website of the provider site 21, and notify the provider site 21 of instructions for registering a customer (hereinafter referred to as "customer registration instructions") from the said website (S101). The provider administrator computer 40 may be, e.g., a PC or a portable device such as a smartphone. The provider administrator includes, in the customer registration instructions, the organization name of the customer desired to be registered and the administrator email address of the customer administrator of the said customer.

When the customer registration instructions are notified in S101, the provider site 21 checks whether the organization name included in the customer registration instructions notified in S101 has been registered as an organization name or subdirectory name in the organization management database 24 (S102).

When it is checked in S102 that the organization name included in the customer registration instructions notified in S101 has been registered as an organization name or subdirectory name in the organization management database 24, the provider site 21 notifies the provider administrator computer 40 via the website of the provider site 21 that the registration of the customer has failed due to an unavailable organization name (S103).

Upon receiving the notification in S103, the provider administrator computer 40 executes a notification, through, e.g., a displaying on a display (not depicted), that the registration of the customer has failed due to the unavailable organization name (S104). Thus, the provider administrator can recognize that the registration of the customer has failed due to the unavailable organization name.

When it is checked in S102 that the organization name included in the customer registration instructions notified in S101 has not been registered as either an organization name or a subdirectory name in the organization management database 24, the provider site 21 creates a customer site 22 in the cloud server 20, which is identified by a subdirectory name denoted by a character string identical to that of the organization name included in the customer registration instructions notified in S101 (S105).

Next, the provider site 21 requests the main controller 23 to register the combination of: the organization name included in the customer registration instructions notified in S101, the subdirectory name denoted by the character string identical to that of the said organization name, and the administrator email address included in the customer registration instructions notified in S101, to the organization management database 24 (S106).

Upon receiving the request in S106, the main controller 23 generates a unique organization number that has not been registered in the organization management database 24 (S107).

Next, the main controller 23 registers the combination of: the organization name, subdirectory name and administrator email address, that are requested to be registered to the organization management database 24 in S106, and the organization number generated in S107, to the organization management database 24 (S108). In other words, the main controller 23 assigns the customer site 22 with the organization number.

FIG. 6 depicts an example of the organization management database 24 immediately after a customer is registered.

The organization management database 24 depicted in FIG. 6 represents the example immediately after a customer whose organization name is "OrganizationD" is registered. FIG. 6 illustrates that, regarding the customer whose organization name is "OrganizationD", the organization name, the subdirectory name, the organization number and the administrator email address have been registered, but the administrator PIN has not yet been registered.

As depicted in FIG. 5, after processing in S108, the main controller 23 notifies the provider site 21 that the registration of the organization name, the subdirectory name, the organization number and the administrator email address, of the customer site 22, to the organization management database 24 has completed (S109).

Upon receiving the notification in S109, the provider site 21 sends an email notifying the completion of the registration of the customer (hereinafter referred to as a "customer registration completion email") to the administrator email address included in the customer registration instructions notified in S101 (S110). The provider site 21 includes, in the customer registration completion email, a uniform resource locator (URL) used for accessing the customer site 22. In this regard, the URL used for accessing the customer site 22 is denoted by the domain of the cloud server 20 and the subdirectory name registered in S108. For example, when the domain of the cloud server 20 is "abcserver.biz" and the sub directory name registered in S108 is "OrganizationD", the URL used for accessing the customer site 22 is "https://abcserver.biz/OrganizationD".

After processing in S110, the provider site 21 notifies the provider administrator computer 40 via the website of the provider site 21 that the registration of the customer has succeeded (S111).

Upon receiving the notification in S111, the provider administrator computer 40 executes a notification, through, e.g., a displaying on a display (not depicted), that the registration of the customer has succeeded (S112). Thus, the provider administrator can recognize that the registration of the customer has succeeded.

Incidentally, the provider administrator can change the organization name or the administrator email address, that is registered in the organization management database 24, via the website of the provider site 21 with use of the provider administrator computer 40. However, the subdirectory name and the organization number, registered in the organization management database 24, are fixed information that cannot be changed.

The operation of the system 10 in order to register an administrator PIN to the organization management database 24 is described below.

Figure 7:
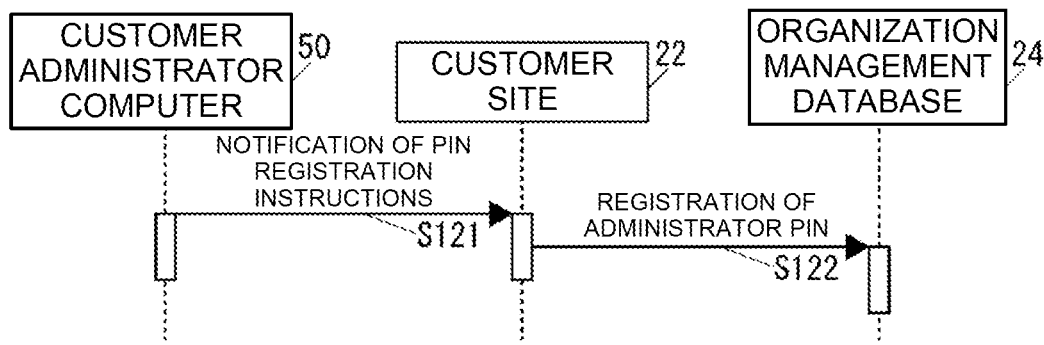
FIG. 7 is a sequence diagram depicting the operation of the system of FIG. 1 when registering an administrator PIN to the organization management database.

FIG. 7 is a sequence diagram of the operation of the system 10 when registering an administrator PIN to the organization management database 24.

In the following description of the operation depicted in FIG. 7, the customer site 22 is illustrated as an example of a customer site of a customer to which the customer administrator belongs.

As depicted in FIG. 7, the customer administrator can use a computer (hereinafter referred to as a "customer administrator computer") 50 to access the website of the customer site 22, and notify the customer site 22 of instructions for registering the administrator PIN of the customer administrator (hereinafter referred to as "PIN registration instructions") via the said website (S121). The customer administrator computer 50 may be, e.g., a PC or a portable device such as a smartphone. The customer administrator includes, in the PIN registration instructions, the administrator PIN desired to be registered. The customer administrator uses the URL noted in the email sent to the administrator email address in S110 as a URL for accessing the website of the customer site 22.

When the PIN registration instructions are notified in S121, the customer site 22 registers the administrator PIN included in the PIN registration instructions notified in S121 to the organization management database 24 as the administrator PIN of the customer site 22 (S122).

The operation of the system 10 in order for the customer administrator to refer to an organization number is described below.

Figure 8:
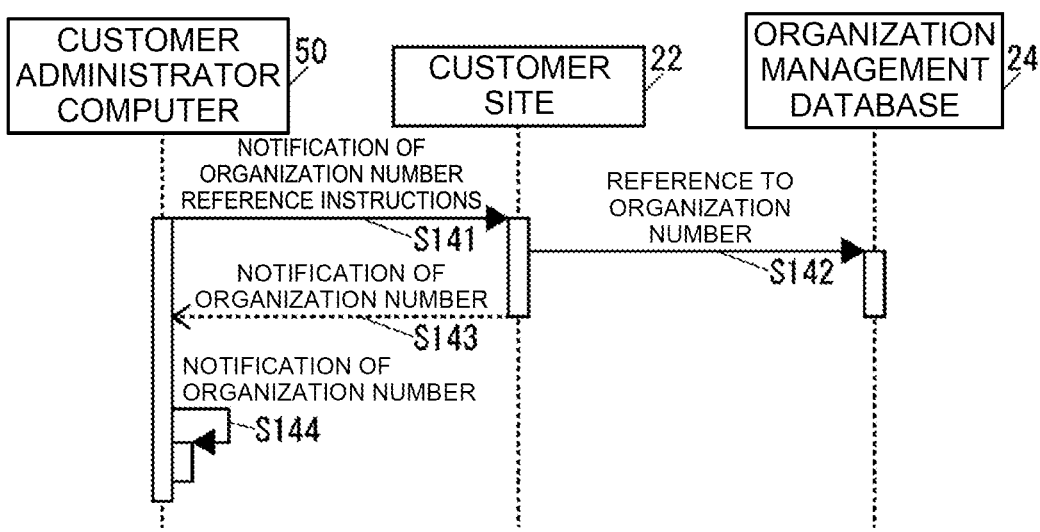
FIG. 8 is a sequence diagram depicting the operation of the system of FIG. 1 when a customer administrator refers to an organization number.

FIG. 8 is a sequence diagram of the operation of the system 10 when the customer administrator refers to an organization number.

In the following description of the operation depicted in FIG. 8, the customer site 22 is illustrated as an example of a customer site of a customer to which the customer administrator belongs.

As depicted in FIG. 8, the customer administrator can use the customer administrator computer 50 to access the website of the customer site 22, and notify the customer site 22 of instructions for referring to the organization number of the customer to which the customer administrator belongs (hereinafter referred to as "organization number reference instructions") via the said website (S141). The customer administrator uses the URL noted in the email sent to the administrator email address in S110 as a URL for accessing the website of the customer site 22.

When the organization number reference instructions are notified in S141, the customer site 22 refers to the organization number of the customer corresponding to the customer site 22 in the organization management database 24 (S142).

Next, the customer site 22 notifies the customer administrator computer 50 of the organization number referred to in S142 via the website of the customer site 22 (S143). In other words, the customer site 22 notifies the customer administrator of the organization number.

When the organization number is notified in S143, the customer administrator computer 50 executes a notification of the organization number notified in S143 through, e.g., a displaying on a display (not depicted) (S144). Thus, the customer administrator can recognize the organization number of the customer corresponding to the customer site 22.

The operation of the system 10 in order for the MFP to check the customer site to which the said MFP is registered is described below.

Figure 9:
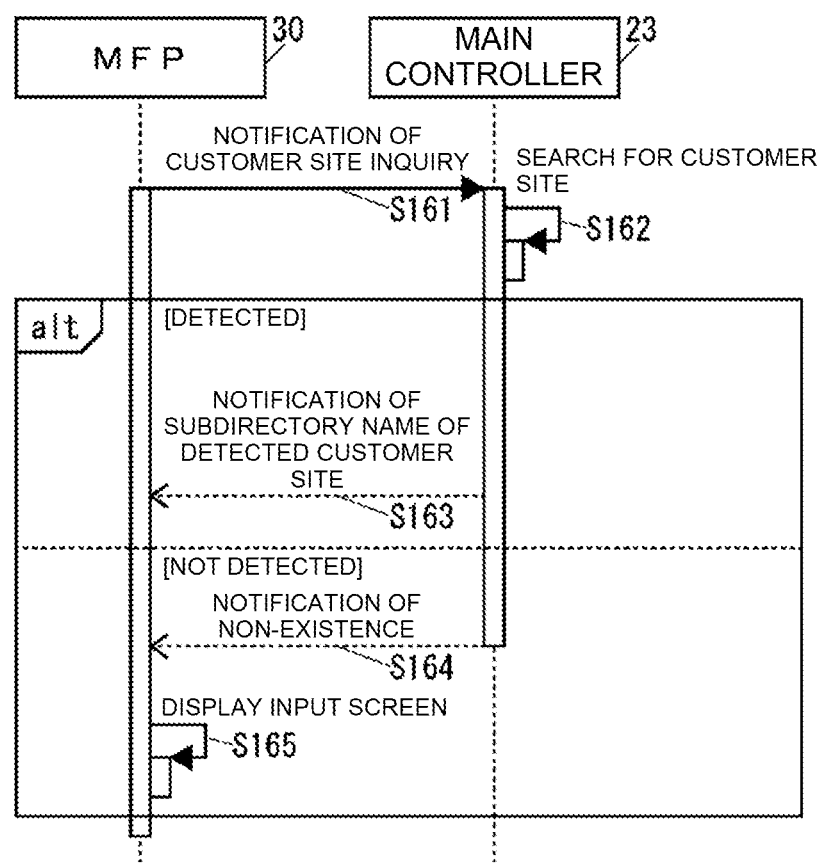
FIG. 9 is a sequence diagram depicting the operation of the system of FIG. 1 when the MFP checks a customer site to which the MFP is registered.

FIG. 9 is a sequence diagram of the operation of the system 10 when the MFP checks the customer site to which the said MFP is registered.

In the following description of the operation depicted in FIG. 9, the customer site 22 is illustrated as an example of a customer site of a customer to which the customer administrator belongs, and the MFP 30 is illustrated as an example of an MFP operated by the customer administrator.

The customer administrator can install the equipment application program 37a on the MFP 30 or activate the equipment application program 37a installed on the MFP 30, via, e.g., the operation acceptor 31 of the MFP 30.

When the equipment application program 37a is installed on the MFP 30, or when the equipment application program 37a installed on the MFP 30 is activated, the equipment app 38a of the MFP 30 operates to notify the main controller 23 of the cloud server 20 of an inquiry about a customer site to which the MFP 30 has been registered (hereinafter referred to as a "customer site inquiry"), as depicted in FIG. 9 (S161). The equipment app 38a operates to include the serial number of the MFP 30 in the customer site inquiry. In this connection, the equipment app 38a can operate to access the main controller 23 by accessing the domain of the cloud server 20 that has been set in the equipment application program 37a.

When the customer site inquiry is notified in S161, the main controller 23 of the cloud server 20 searches for a customer site in which the serial number included in the customer site inquiry notified in S161 has been registered to the equipment management database (S162).

If the customer site in which the serial number included in the customer site inquiry notified in S161 has been registered to the equipment management database is detected in S162, the main controller 23 notifies the subdirectory name of the customer site detected in S162 to the equipment app 38a of the MFP 30 (S163). Consequently, the equipment app 38a can operate to access the customer site 22 identified by the URL denoted by the domain of the cloud server 20 and the subdirectory name notified in S163, until the execution of the equipment app 38a is completed. Thus, the equipment app 38a can operate to access the customer site 22 in order to, e.g., perform either cloud printing or cloud scanning.

If a customer site in which the serial number included in the customer site inquiry notified in S161 has been registered to the equipment management database is not detected in S162, the main controller 23 notifies the equipment app 38a of the MFP 30 that a customer site to which the MFP 30 is registered does not exist (S164).

Upon receiving the notification in S164, the equipment app 38a operates to display a screen that instructs the entering of the organization number of the customer site to which the customer administrator wishes to register the MFP 30 and the administrator PIN of the customer administrator (hereinafter referred to as an "input screen") on the display 32 (S165).

The operation of the system 10 in order to register an MFP to the customer site is described below.

Figure 10:
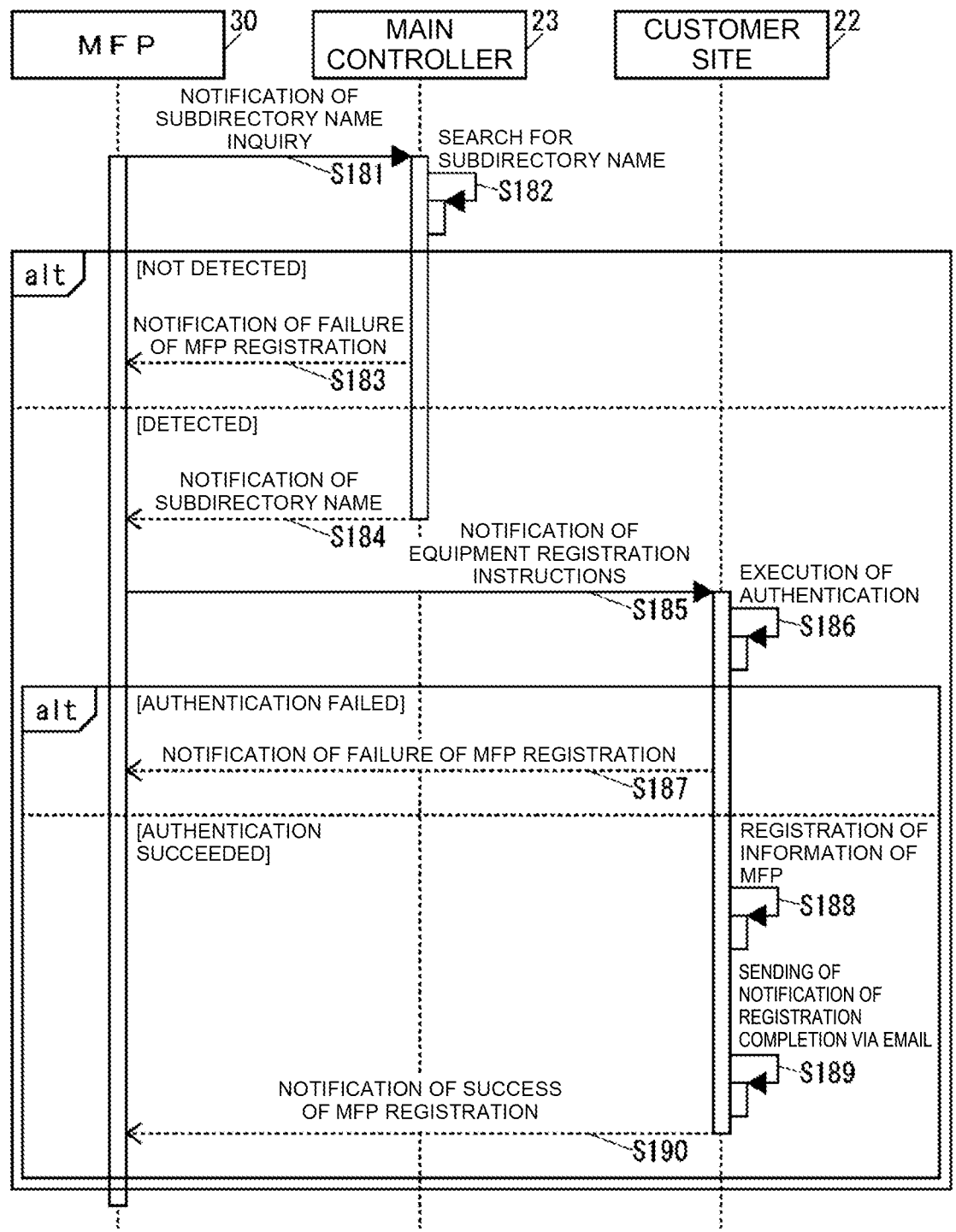
FIG. 10 is a sequence diagram depicting one example of the operation of the system of FIG. 1 when registering the MFP to the customer site.

FIG. 10 is a sequence diagram depicting an example of the operation of the system 10 when registering an MFP to the customer site.

In the following description of the operation depicted in FIG. 10, the customer site 22 is illustrated as an example of a customer site of a customer to which the customer administrator belongs, and the MFP 30 is illustrated as an example of an MFP operated by the customer administrator.

The customer administrator can enter, in the input screen displayed on the display 32 of the MFP 30 in S165, the organization number of the customer site 22 to which the customer administrator wishes to register the MFP 30 and the administrator PIN of the customer administrator, via the operation acceptor 31 of the MFP 30. In this regard, the customer administrator may use the organization number notified in S144 as the organization number of the customer site 22.

As depicted in FIG. 10, when the organization number and the administrator PIN are entered in the input screen, the equipment app 38a of the MFP 30 notifies the main controller 23 of the cloud server 20 of an inquiry about a subdirectory name (hereinafter referred to as a "subdirectory name inquiry") (S181). The equipment app 38a operates to include the organization number entered in the input screen in the subdirectory name inquiry. In other words, the MFP 30 notifies the cloud server 20 of the organization number entered by the customer administrator, and thereby queries the cloud server 20 about a subdirectory name for the customer site 22. In this connection, the equipment app 38a can operate to access the main controller 23 by accessing the domain of the cloud server 20 in S181 that has been set in the equipment application program 37a.

When the subdirectory name inquiry is notified in S181, the main controller 23 of the cloud server 20 searches for a subdirectory name associated with the organization number included in the subdirectory name inquiry notified in S181 in the organization management database 24 (S182).

If a subdirectory name associated in the organization management database 24 with the organization number included in the subdirectory name inquiry notified in S181 is not detected in S182, the main controller 23 notifies the equipment app 38a of the MFP 30 that the registration of the MFP 30 to the customer site has failed (S183). Thus, the equipment app 38a can operate a notification that the registration of the MFP 30 to the customer site has failed, through, e.g., a displaying on the display 32.

If the subdirectory name associated in the organization management database 24 with the organization number included in the subdirectory name inquiry notified in S181 is detected in S182, the main controller 23 notifies the equipment app 38a of the MFP 30 of the subdirectory name detected in S182 (S184).

Upon receiving the notification in S184, the equipment app 38a operates to notify instructions for registering the MFP 30 (hereinafter referred to as "equipment registration instructions") to the customer site 22 that is identified by a URL denoted by the domain of the cloud server 20 and the subdirectory name notified in S184 (S185). The equipment app 38a operates to include, in the equipment registration instructions, the serial number of the MFP 30 and the administrator PIN entered in the input screen. In other words, the MFP 30 accesses the customer site 22 with use of the subdirectory name notified by the cloud server 20, and notifies the accessed customer site 22 of the serial number of the MFP 30.

When the equipment registration instructions are notified in S185, the customer site 22 executes authentication based on the administrator PIN included in the equipment registration instructions notified in S185 (S186). In this regard, the customer site 22 determines that the authentication has succeeded, if the administrator PIN included in the equipment registration instructions notified in S185 coincides with the administrator PIN associated with the customer site 22 in the organization management database 24. On the other hand, the customer site 22 determines that the authentication has failed, if the administrator PIN included in the equipment registration instructions notified in S185 does not coincide with the administrator PIN associated with the customer site 22 in the organization management database 24.

If the authentication executed in S186 has failed, the customer site 22 notifies the equipment app 38a of the MFP 30 that the registration of the MFP 30 to the customer site has failed (S187). Thus, the equipment app 38a can operate a notification that the registration of the MFP 30 to the customer site has failed, through, e.g., a displaying on the display 32.

If the authentication executed in S186 has succeeded, the customer site 22 registers the information of the MFP 30, that includes the serial number included in the equipment registration instructions notified in S185, to the equipment management database 22a (S188). In other words, the customer site 22 manages the serial number notified by the MFP 30, and thereby the customer site 22 in the multi-tenant cloud service is associated with the MFP 30 using the said customer site 22.

Next, the customer site 22 sends the notification of the completion of the registration of the MFP 30 to the customer site 22 by email to the administrator email address associated with the customer site 22 in the organization management database 24 (S189).

Next, the customer site 22 notifies the equipment app 38a of the MFP 30 that the registration of the MFP 30 to the customer site 22 has succeeded (S190). Thus, the equipment app 38a can operate a notification that the registration of the MFP 30 to the customer site 22 has succeeded, through, e.g., a displaying on the display 32. Upon receiving the notification in S190, the equipment app 38a can operate to access the customer site 22 identified by the URL denoted by the domain of the cloud server 20 and the subdirectory name notified in S184, until the execution of the equipment app 38a is completed. Thus, the equipment app 38a can operate to access the customer site 22 in order to, e.g., perform either cloud printing or cloud scanning.

As explained above, the system 10 is configured to associate the customer site in the multi-tenant cloud service with the MFP using the said customer site by the act of the customer administrator to enter the organization number of the customer corresponding to the customer site into the MFP, rather than the subdirectory name for accessing the customer site (S181 to S188). In this regard, the subdirectory name for accessing the customer site is equivalent to the organization name of the customer corresponding to the said customer site, and has been entered by the provider administrator during the registration of the said customer (S101 to S108). The organization name of the customer is information that can be freely determined by the respective provider administrator, and thus is likely to be a complex and lengthy string of characters. In other words, the subdirectory name for accessing the customer site is likely to be a complex and long string of characters.

On the other hand, the organization number of the customer is identification information that is assigned by the cloud server 20 to the customer site (S107 to S108), and thus is likely to be a shorter and simpler string of characters than that of the subdirectory name for accessing the customer site. The system 10 associates the customer site in the multi-tenant cloud service with the MFP using the said customer site by the act of the customer administrator to enter the organization number denoted by a short and simple string of characters into the MFP, and therefore is capable of reducing the workload of associating the customer site in the multi-tenant cloud service with the MFP using the said customer site.

The system 10 has a configuration in which the customer site manages the serial number notified by the MFP when the administrator PIN entered in the MFP coincides with the administrator PIN associated with the customer site, i.e., in a case where the authentication of the customer administrator based on the administrator PIN entered in the MFP has succeeded (S188). Thus, the system 10 is capable of reducing a possibility that the customer site mismanages the serial number of the MFP.

In this embodiment, the system 10 performs the authentication of a user based on the administrator PIN entered in the MFP, which is a user authentication based on information entered in the MFP. However, the user authentication based on information entered into the MFP may also be an authentication based on information other than the administrator PIN. For example, the user authentication based on information entered in the MFP may be an authentication based on ID and password entered in the MFP, or on IC card information entered by an IC card in the MFP.

The system 10 may have a configuration in which the customer site requests the user for permission to manage the serial number of the MFP, when the serial number is notified to the customer site by the MFP, instead of the authentication of the user based on the information entered in the MFP. In other words, the system 10 may perform the operation depicted in FIG. 11, instead of the operation depicted in FIG. 10.

Figure 11:
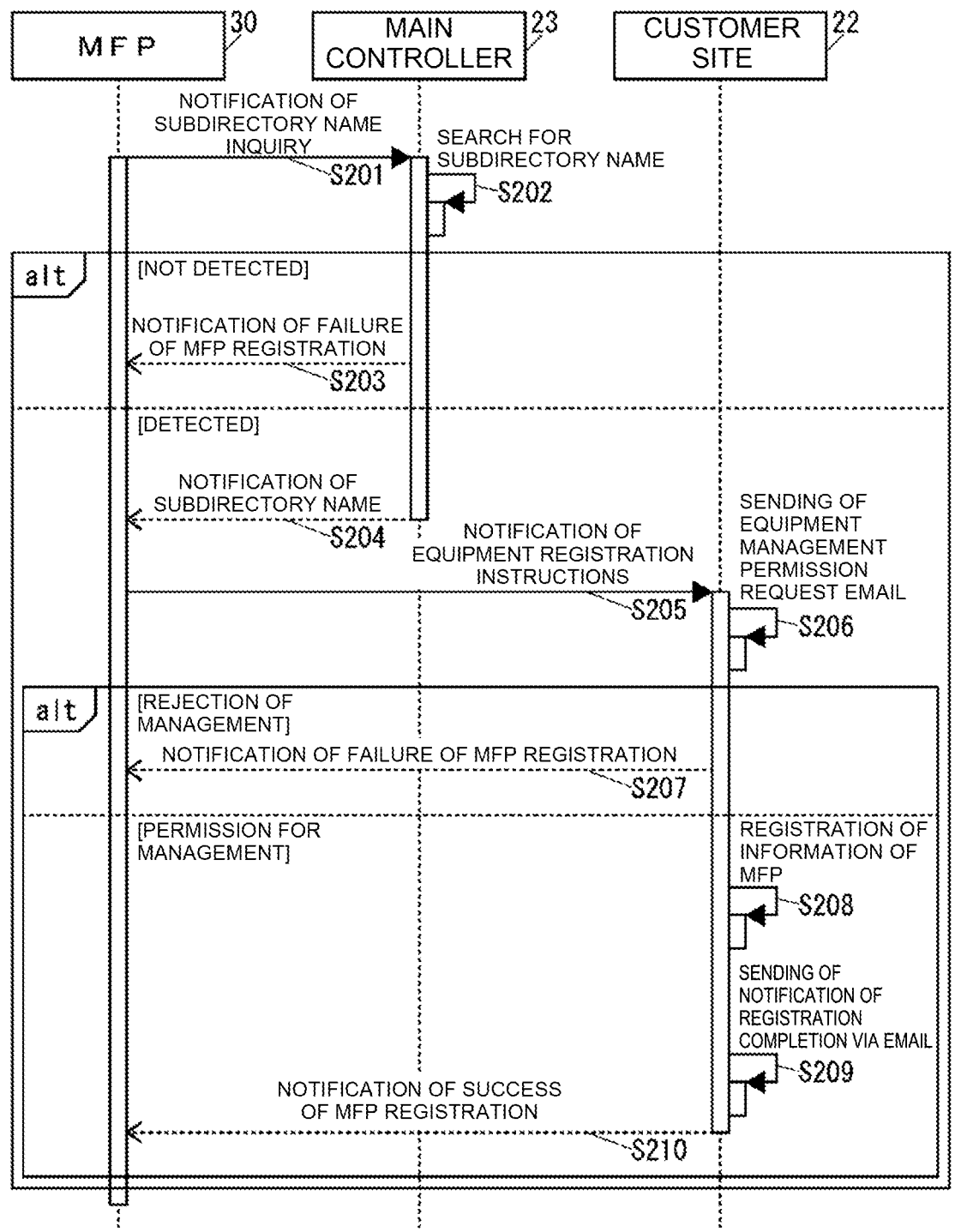
FIG. 11 is a sequence diagram depicting another example of the operation of the system of FIG. 1, different from the example of FIG. 10, when registering the MFP to the customer site.

FIG. 11 is a sequence diagram depicting another example of the operation of the system 10 when registering an MFP to the customer site, which is different from the example depicted in FIG. 10.

In the following description of the operation depicted in FIG. 11, the customer site 22 is illustrated as an example of a customer site of a customer to which the customer administrator belongs, and the MFP 30 is illustrated as an example of an MFP operated by the customer administrator.

In a case where the system 10 performs the operation depicted in FIG. 11, the organization management database 24 does not need to manage the administrator PIN. Therefore, when performing the operation depicted in FIG. 11, the system 10 does not perform the operation depicted in FIG. 7. Further, when the system 10 performs the operation depicted in FIG. 11, the input screen displayed on the display 32 by the equipment app 38*a* in S165 is a screen that instructs the entering of the organization number of the customer site to which the customer administrator wishes to register the MFP 30, but does not instruct the entering of the administrator PIN of the customer administrator.

As depicted in FIG. 11, the system 10 performs the processes of S201 to S204 similar to the processes of S181 to S184.

Next, the equipment app 38*a* executes the process of S205 similar to the process of S185. In this regard, the equipment app 38*a* operates to include the serial number of the MFP 30 in the equipment registration instructions, but not include the administrator PIN in the equipment registration instructions.

When the equipment registration instructions are notified in S205, the customer site 22 sends an email for requesting the customer administrator for permission to manage the serial number of the MFP 30 (hereinafter referred to as an "equipment management permission request email") to the administrator email address associated in the organization management database 24 with the customer corresponding to the customer site 22 (S206).

Figure 12:
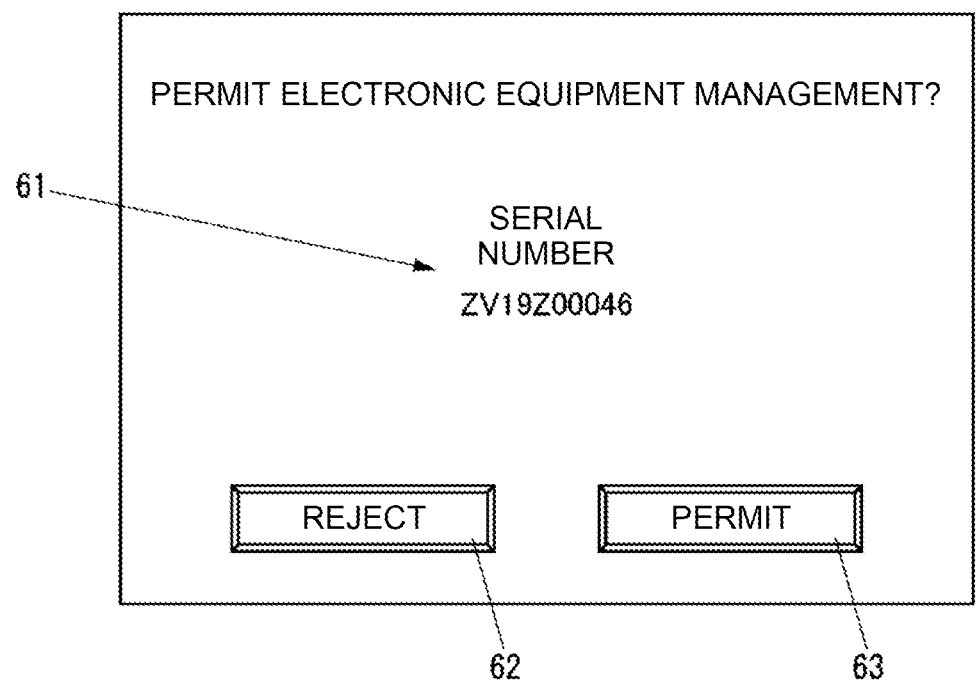
FIG. 12 depicts an example of a part of an equipment management permission request email sent in the operation depicted in FIG. 11.

FIG. 12 depicts an example of a part of an equipment management permission request email.

As depicted in FIG. 12, the equipment management permission request email contains a text 61 indicating the serial number of the MFP 30, a reject button 62 to reject the customer site 22 from managing the serial number of the MFP 30, and a permit button 63 to permit the customer site 22 to manage the serial number of the MFP 30. When the reject button 62 is pressed, the computer that opens the equipment management permission request email notifies the customer site 22 of rejection to manage the serial number of the MFP 30. When the permit button 63 is pressed, the computer that opens the equipment management permission request email notifies the customer site 22 of permission to manage the serial number of the MFP 30.

As depicted in FIG. 11, when the rejection to manage the serial number of the MFP 30 is notified after the process of S206, the customer site 22 executes the process of S207 similar to the process of S187.

When the permission to manage the serial number of the MFP 30 is notified after the process of S206, the customer site 22 executes the processes of S208 to S210 similar to the processes of S188 to S190.

In the case where the system 10 performs the operation depicted in FIG. 11, the customer site manages the serial number notified by the MFP when the customer administrator permits the management of the serial number of the MFP (S208). Thus, when executing the operation depicted in FIG. 11, the system 10 is capable of reducing a possibility that the customer site mismanages the serial number of the MFP.

In the operation depicted in FIG. 11, the customer site 22 uses an email to request the customer administrator for permission to manage the serial number of the MFP 30. However, the customer site 22 may request the customer administrator for permission to manage the serial number of the MFP 30 by means other than email. For example, if a dedicated application is installed on the customer administrator computer 50, the customer site 22 may request the customer administrator for permission to manage the serial number of the MFP 30 by means of a notification function provided in the said application.

The system 10 may have a configuration in which the customer site manages the serial number notified by the MFP, when the serial number is notified to the customer site by the MFP, without executing the authentication of the user based on the information entered in the MFP as well as the request by the customer site to the user for permission to manage the serial number of the MFP. In other words, the system 10 may perform the operation depicted in FIG. 13, instead of the operation depicted in FIGS. 10 and 11.

Figure 13:
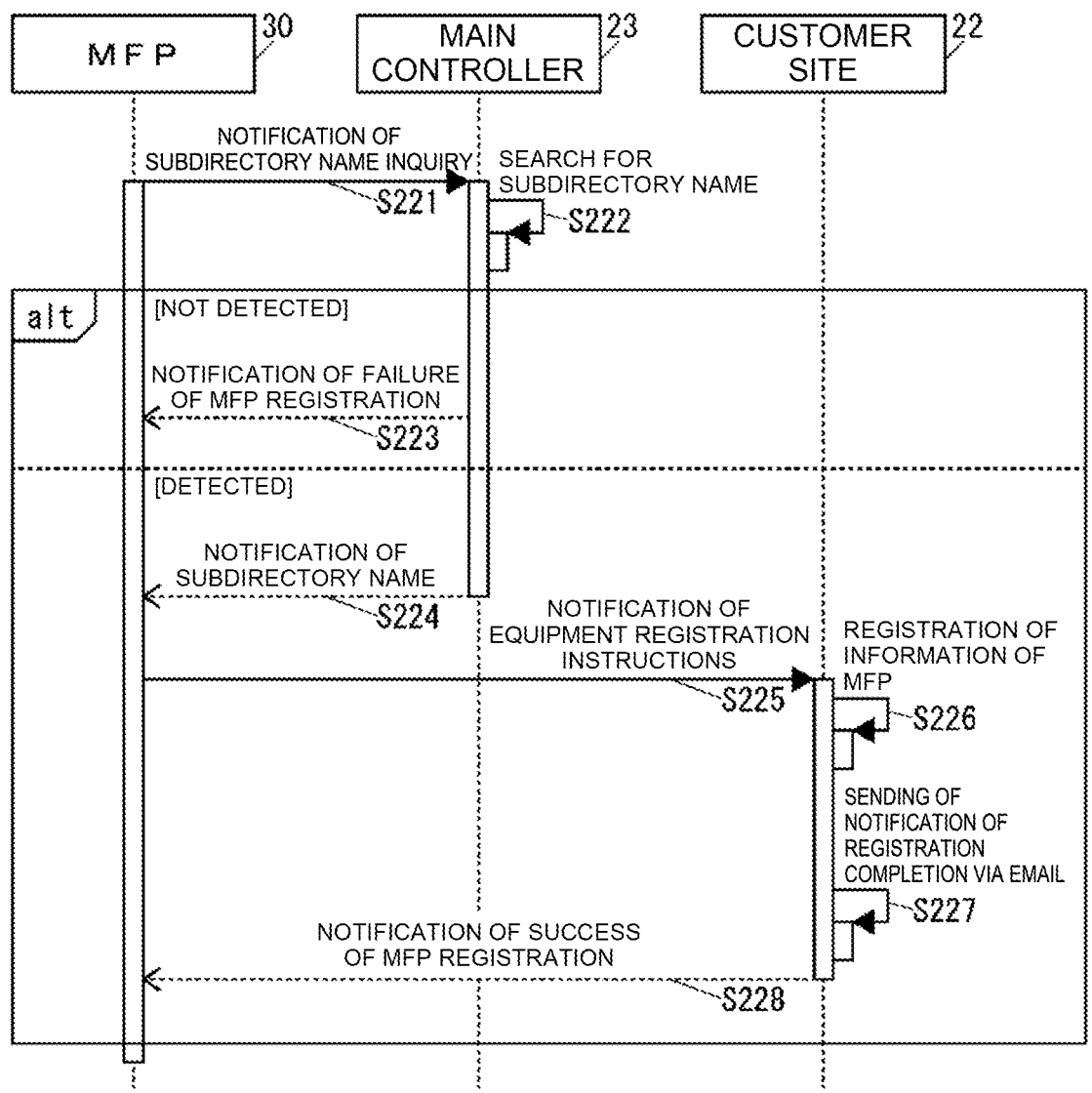
FIG. 13 is a sequence diagram depicting a further example of the operation of the system of FIG. 1, different from the examples of FIGS. 10 and 11, when registering the MFP to the customer site.

FIG. 13 is a sequence diagram depicting a further example of the operation of the system 10 when registering an MFP to the customer site, which is different from the examples depicted in FIGS. 10 and 11.

In the following description of the operation depicted in FIG. 13, the customer site 22 is illustrated as an example of a customer site of a customer to which the customer administrator belongs, and the MFP 30 is illustrated as an example of an MFP operated by the customer administrator.

In a case where the system 10 performs the operation depicted in FIG. 13, the organization management database 24 does not need to manage the administrator PIN. Therefore, when performing the operation depicted in FIG. 13, the system 10 does not perform the operation depicted in FIG. 7. Further, when the system 10 performs the operation depicted in FIG. 13, the input screen displayed on the display 32 by the equipment app 38a in S165 is a screen that instructs the entering of the organization number of the customer site to which the customer administrator wishes to register the MFP 30, but does not instruct the entering of the administrator PIN of the customer administrator.

As depicted in FIG. 13, the system 10 performs the processes of S221 to S224 similar to the processes of S181 to S184.

Next, the equipment app 38a executes the process of S225 similar to the process of S185. In this regard, the equipment app 38a operates to include the serial number of the MFP 30 in the equipment registration instructions, but not include the administrator PIN in the equipment registration instructions.

When the equipment registration instructions are notified in S225, the customer site 22 executes the processes of S226 to S228 similar to the processes of S188 to S190.

Although the system 10 is provided with the cloud server 20 in this embodiment, the system 10 may be provided with any server other than a cloud server, which has functions similar to those of the cloud server 20, instead of the cloud server 20.

Second Embodiment

First, the configuration of a system according to the second embodiment of the present disclosure is described.

Figure 14:
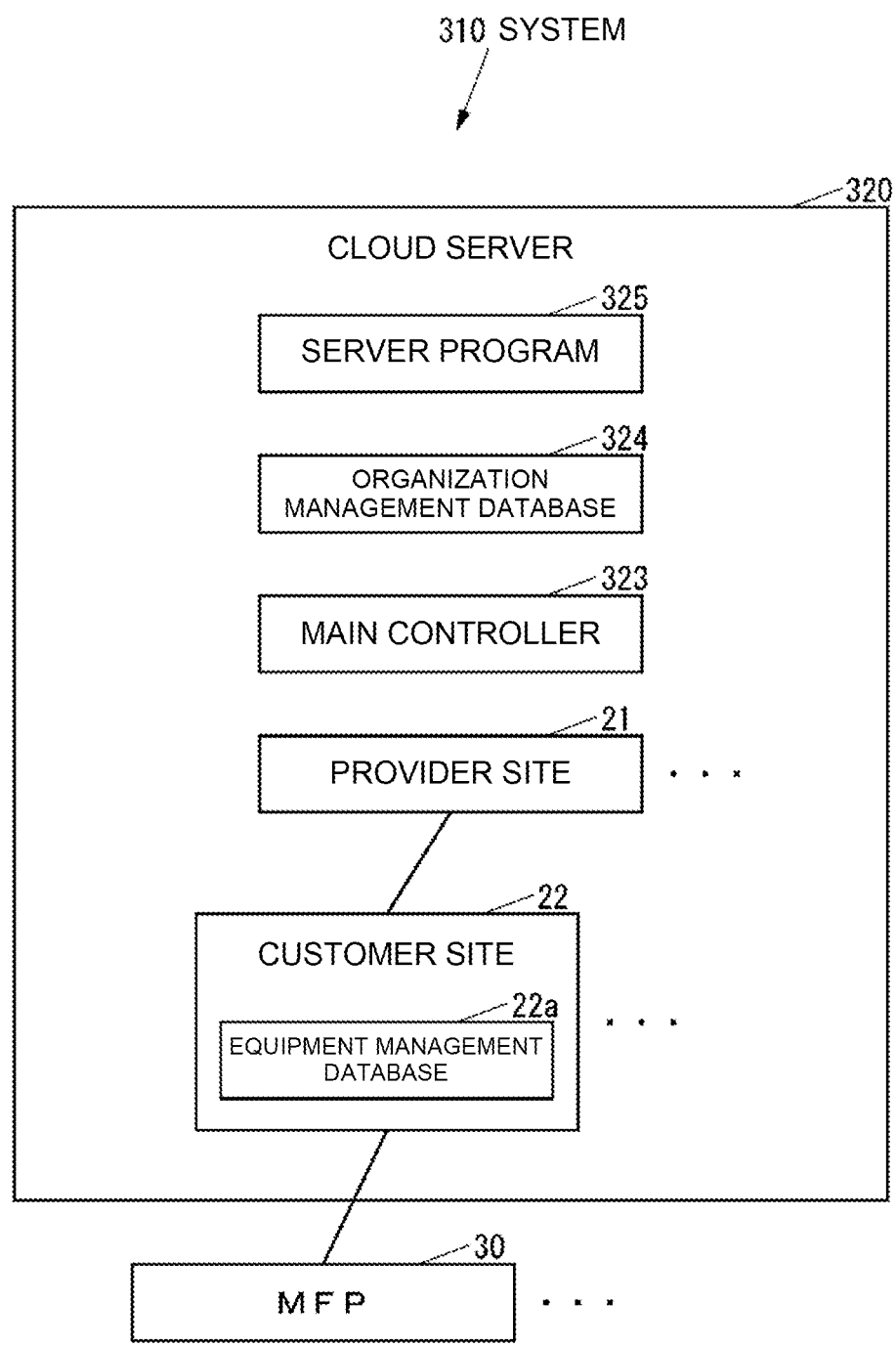
FIG. 14 is a block diagram of a system according to the second embodiment of the present disclosure.

FIG. 14 is a block diagram of the system 310 according to this embodiment.

Among the components of the system 310 depicted in FIG. 14, components corresponding to those of the system 10 (FIG. 1) are denoted by same reference numerals as those in the system 10, and the detailed descriptions thereof are not repeated.

The configuration of system 310 is similar to the configuration of the system 10 that is provided with a multitenant cloud server 320 in place of the cloud server 20 (FIG. 1).

The configuration of the cloud server 320 is similar to the configuration of the cloud server 20 that includes a main controller 323 that executes a control such as searching a customer site where an MFP is registered, an organization management database 324 that manages a customer, and a server program 325, instead of the main controller 23 (FIG. 1), the organization management database 24 (FIG. 1) and the server program 25 (FIG. 1).

The cloud server 320 executes the server program 325 and thereby achieves operations described below.

FIG. 15 depicts an example of the organization management database 324.

As depicted in FIG. 15, the organization management database 324 has a table 324a that indicates, for each customer, an organization name, a subdirectory name, an administrator email address, and an administrator PIN. The organization management database 324 also has a reservation number table 324b that indicates, for each customer, a reservation number required to register the MFP to the customer site, an organization name, and an expiration date of the reservation number.

The reservation number is denoted by, e.g., a five-digit number. All reservation numbers registered in the organization management database 324 are unique and different from each other. The reservation number is the identification information of the customer site as a tenant, and constitutes tenant identification information.

The operation of the system 310 will be described below.

The operation of the system 310 is similar to that of the system 10, except for the operation described below.

First, the operation of the system 310 in order to register a customer is described.

FIG. 16 is a sequence diagram of the operation of the system 310 when registering a customer.

In the following description of the operation depicted in FIG. 16, the provider site 21 is illustrated as an example of a provider site of a provider to which the provider administrator belongs, and the customer site 22 is illustrated as an example of a customer site of a customer who is registered by the said provider administrator.

As depicted in FIG. 16, the system 310 performs the processes of S401 to S406 similar to the processes of S101 to S106.

Upon receiving the request in S406, the main controller 323 generates a unique reservation number that has not been registered in the organization management database 324 and an expiration date of the said reservation number (S407). For example, the main controller 323 may generate, as the expiration date, date and time after a certain time of current date and time, such as after 24 hours of current date and time.

After processing in S407, the main controller 323 registers the combination of: the organization name, subdirectory name and administrator email address, that are requested to be registered to the organization management database 324 in S406, and the reservation number and expiration date, that are generated in S407, to the organization management database 324 (S408). In other words, the main controller 323 assigns the customer site 22 with the reservation number.

After processing in S408, the system 310 performs the processes of S409 to S412 similar to the processes of S109 to S112.

The operation of the system 310 in order for the customer administrator to refer to a reservation number is described below.

The operation of the system 310 in order for the customer administrator to refer to a reservation number is similar to the operation of the system 10 in order for the customer administrator to refer to an organization number, except for the difference between the reservation number and the organization number.

The operation of the system 310 in order for the MFP to check the customer site to which the said MFP is registered is described below.

The operation of the system 310 in order for the MFP to check the customer site to which the said MFP is registered is similar to the operation of the system 10 in order for the MFP to check the customer site to which the said MFP is registered, except for the difference between the reservation number and the organization number.

The operation of the system 310 in order to register an MFP to the customer site is described below.

Figure 17:
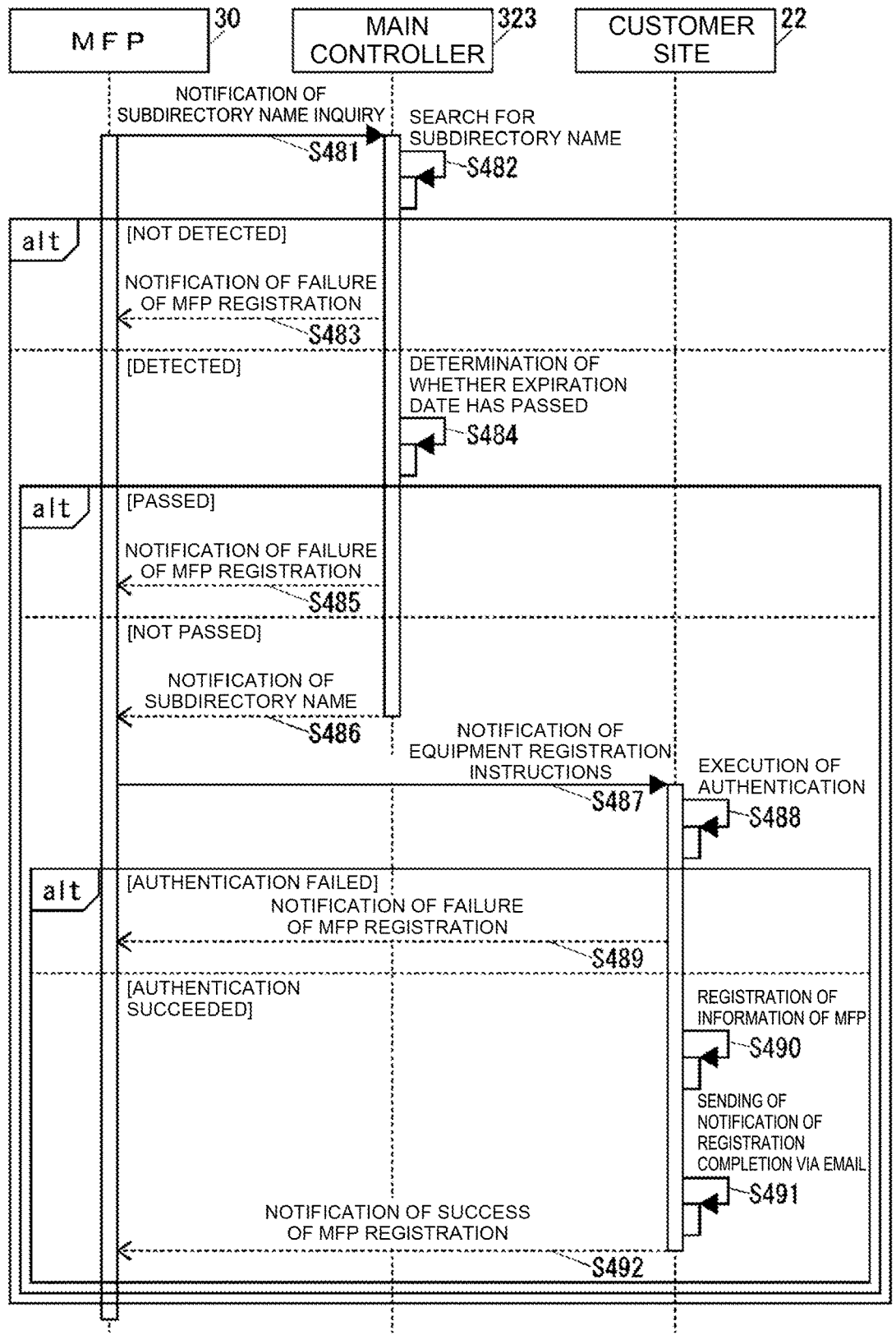
FIG. 17 is a sequence diagram depicting an example of the operation of the system of FIG. 14 when registering the MFP to the customer site.

FIG. 17 is a sequence diagram depicting an example of the operation of the system 310 when registering an MFP to the customer site.

In the following description of the operation depicted in FIG. 17, the customer site 22 is illustrated as an example of a customer site of a customer to which the customer administrator belongs, and the MFP 30 is illustrated as an example of an MFP operated by the customer administrator.

The customer administrator can enter, in the input screen displayed on the display 32 of the MFP 30 in the operation of the system 310 in order for the MFP to check the customer site to which the said MFP is registered, the reservation number of the customer site 22 to which the customer administrator wishes to register the MFP 30 and the administrator PIN of the customer administrator, via the operation acceptor 31 of the MFP 30. In this regard, the customer administrator may use, as the reservation number of the customer site 22, the reservation number notified in the operation of the system 310 in order for the customer administrator to refer to the reservation number.

As depicted in FIG. 17, when the reservation number and the administrator PIN are entered in the input screen, the equipment app 38a of the MFP 30 notifies the main controller 323 of the cloud server 320 of a subdirectory name inquiry (S481). The equipment application 38a operates to include the reservation number entered in the input screen in the subdirectory name inquiry. In other words, the MFP 30 notifies the cloud server 320 of the reservation number entered by the customer administrator, and thereby queries the cloud server 320 about a subdirectory name for the customer site 22. In this connection, the equipment app 38a can operate to access the main controller 323 by accessing the domain of the cloud server 320 in S481 that has been set in the equipment application program 37a.

When the subdirectory name inquiry is notified in S481, the main controller 323 of the cloud server 320 searches for a subdirectory name associated in the organization management database 324 with the reservation number included in the subdirectory name inquiry notified in S481 (S482).

If a subdirectory name associated in the organization management database 324 with the reservation number included in the subdirectory name inquiry notified in S481 is not detected in S482, the main controller 323 notifies the equipment app 38a of the MFP 30 that the registration of the MFP 30 to the customer site has failed (S483). Thus, the equipment app 38a can operate a notification that the registration of the MFP 30 to the customer site has failed, through, e.g., a displaying on the display 32.

If the subdirectory name associated in the organization management database 324 with the reservation number included in the subdirectory name inquiry notified in S481 is detected in S482, the main controller 323 determines whether the expiration date associated in the organization management database 324 with the reservation number included in the subdirectory name inquiry notified in S481 has passed (S484).

If it is determined in S484 that the expiration date associated in the organization management database 324 with the reservation number included in the subdirectory name inquiry notified in S481 has passed, the main controller 323 notifies the equipment app 38a of the MFP 30 that the registration of the MFP 30 to the customer site has failed (S485). Thus, the equipment app 38a can operate a notification that the registration of the MFP 30 to the customer site has failed, through, e.g., a displaying on the display 32.

If it is determined in S484 that the expiration date associated in the organization management database 324 with the reservation number included in the subdirectory name inquiry notified in S481 has not passed, the main controller 323 notifies the equipment app 38a of MFP 30 of the subdirectory name detected in S482 (S486).

After processing in S486, the system 310 performs the processes of S487 to S492 similar to the processes of S185 to S190.

The operation of the cloud server 320 in order to delete a reservation number with a passed expiration date is described below.

Figure 18:
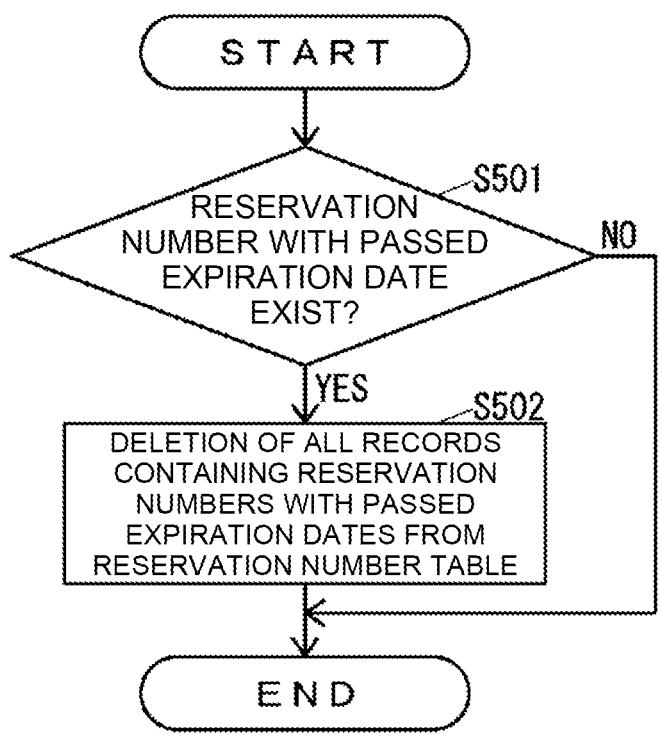
FIG. 18 is a flowchart depicting the operation of the cloud server depicted in FIG. 14 when deleting a reservation number with a passed expiration date.

FIG. 18 is a flowchart depicting the operation of the cloud server 320 when deleting a reservation number with a passed expiration date.

The main controller 323 of the cloud server 320 executes the operation depicted in FIG. 18 at specific timing, e.g., at regular intervals.

As depicted in FIG. 18, the main controller 323 determines whether or not a reservation number associated, in the reservation number table 324b, with an expiration date that has passed exists (S501).

If it is determined in S501 that a reservation number associated, in the reservation number table 324b, with an expiration date that has passed exists, the main controller 323 deletes all records from the reservation number table 324b, which contain the reservation number associated, in the reservation number table 324b, with the passed expiration date (S502).

If it is determined in S501 that a reservation number associated, in the reservation number table 324b, with an expiration date that has passed does not exist, or alternatively the process in S502 is completed, the main controller 323 finishes the operation depicted in FIG. 18.

As explained above, the system 310 is configured to associate the customer site in the multi-tenant cloud service with the MFP using the said customer site by the act of the customer administrator to enter the reservation number of the customer corresponding to the customer site into the MFP, rather than the subdirectory name for accessing the customer site (S481 to S490). In this regard, the subdirectory name for accessing the customer site is equivalent to the organization name of the customer corresponding to the said customer site, and has been entered by the provider administrator during the registration of the said customer (S401 to S408). The organization name of the customer is information that can be freely determined by the respective provider administrator, and thus is likely to be a complex and lengthy string of characters. In other words, the subdirectory name for accessing the customer site is likely to be a complex and long string of characters. On the other hand, the reservation number of the customer is identification information that is assigned by the cloud server 320 to the customer site (S407 to S408), and thus is likely to be a shorter and simpler string of characters than that of the subdirectory name for accessing the customer site. The system 310 associates the customer site in the multi-tenant cloud service with the MFP using the said customer site by the act of the customer administrator to enter the reservation number denoted by a short and simple string of characters into the MFP, and therefore is capable of reducing the workload of associating the customer site in the multi-tenant cloud service with the MFP using the said customer site.

The system 310 has a configuration in which the cloud server 320 assigns the customer site with the reservation number valid for a specific period of time (S407 to S408), and therefore is capable of reducing the number of reservation numbers that exist validly at the same time. Thus, the system 310 is likely to be able to make the character string of the reservation number shorter and simpler than that of the organization number used in the first embodiment, and therefore is capable of further reducing the workload of associating the customer site in the multi-tenant cloud service with the MFP using the said customer site in comparison with the first embodiment.

The system 310 has a configuration in which the cloud server 320 assigns the customer site with the reservation number valid for a specific period of time, so that the customer site manages the serial number notified by the MFP, only for the period of time the reservation number is valid (S481 to S490). Thus, the system 310 is capable of reducing a possibility that the customer site mismanages the serial number of the MFP.

The system 310 has a configuration in which the customer site manages the serial number notified by the MFP when the administrator PIN entered in the MFP coincides with the administrator PIN associated with the customer site, i.e., in a case where the authentication of the customer administrator based on the administrator PIN entered in the MFP has succeeded (S490). Thus, the system 310 is capable of reducing a possibility that the customer site mismanages the serial number of the MFP.

In this embodiment, the system 310 performs the authentication of a user based on the administrator PIN entered in the MFP, which is a user authentication based on information entered in the MFP. However, the user authentication based on information entered into the MFP may also be an authentication based on information other than the administrator PIN. For example, the user authentication based on information entered in the MFP may be an authentication based on ID and password entered in the MFP, or on IC card information entered by an IC card in the MFP.

Similar to the first embodiment, the system 310 may have a configuration in which the customer site requests the user for permission to manage the serial number of the MFP, when the serial number is notified to the customer site by the MFP, instead of the authentication of the user based on the information entered in the MFP. In the configuration wherein the customer site requests the user for permission to manage the serial number of the MFP when the serial number is notified to the customer site by the MFP, the system 310 is capable of reducing a possibility that the customer site mismanages the serial number of the MFP.

Similar to the first embodiment, the system 310 may have a configuration in which the customer site manages the serial number notified by the MFP, when the serial number is notified to the customer site by the MFP, without executing the authentication of the user based on the information entered in the MFP as well as the request by the customer site to the user for permission to manage the serial number of the MFP.

Although the system 310 is provided with the cloud server 320 in this embodiment, the system 310 may be provided with any server other than a cloud server, which has functions similar to those of the cloud server 320, instead of the cloud server 320.

The tenant identification information of the present disclosure consists only of numerals, in each of the embodiments described above. However, the tenant identification information of the present disclosure may include characters other than numerals, or may consist only of characters other than numerals.

The access information of the present disclosure is a subdirectory name, in each of the embodiments described above. However, the access information of the present disclosure may be information other than a subdirectory name. For example, the access information of the present disclosure may be a subdomain.

The electronic equipment of the present disclosure is an MFP, in each of the embodiments described above. However, the electronic equipment of the present disclosure may be image forming equipment other than the MFP such as a dedicated printer, or may be electronic equipment other than the image forming equipment such as a PC.

What is claimed is:

1. A system comprising:
a multi-tenant cloud server, and
electronic equipment that uses a tenant of the cloud server, wherein:
the cloud server generates tenant identification information to identify the tenant, stores therein the generated tenant identification information in association with access information to access the tenant, and notifies the electronic equipment of the tenant identification information that has been stored;
the electronic equipment, in response to input of the tenant identification information from a user, notifies the cloud server of a query of the access information, which includes the input tenant identification information;
the cloud server, in response to the query from the electronic equipment, notifies the electronic equipment of the access information stored therein in association with the tenant identification information included in the query;
the electronic equipment accesses the tenant with the use of the access information notified by the cloud server to notify the tenant of an instruction for registering the electronic equipment, which includes authentication information of the user and equipment identification information to specify the electronic equipment;
the cloud server stores, in the tenant, the equipment identification information by included in the instruction from the electronic equipment, in accordance with authentication of the authentication information and associates the electronic equipment with the tenant; and
the cloud server is arranged to provide a cloud-based pull-printing function and a cloud-based scanning function so that the electronic equipment performs the cloud-based pull-printing function and the cloud-based scanning function by using the tenant that is associated with the electronic equipment.

2. The system of claim 1, wherein the cloud server assigns the tenant with the tenant identification information valid for a specific period of time.

3. The system of claim 1, wherein the tenant manages the equipment identification information notified by the electronic equipment in a case where authentication of the user based on information entered in the electronic equipment is succeeded.

4. The system of claim 1, wherein the tenant manages the equipment identification information notified by the electronic equipment in a case where, when the equipment identification information is notified by the electronic equipment, the tenant requests the user for permission to manage the equipment identification information and thereafter the user permits the tenant to manage the equipment identification information.

5. A non-transitory computer-readable storage medium having stored thereon a server program to be executed by a multi-tenant cloud server, the server program causes the cloud server to function to:

generate tenant identification information to identify a tenant of the cloud server and store the generated tenant identification information in association with access information to access the tenant;

notify an electronic equipment using the tenant of the tenant identification information that has been stored in the cloud server;

receive, from the electronic equipment, a query of the access information, which includes the tenant identification information and notify the electronic equipment of the access information stored with being associated with the tenant identification information included in the query received from the electronic equipment;

receive an instruction for registering the electronic equipment, which includes authentication information of a user and equipment identification information to specify the electronic equipment from the electronic equipment which accesses the tenant using the notified access information;

store the equipment identification information included in the received instruction in the tenant in accordance with authentication of the authentication information and associate the electronic equipment with the tenant; and provide a cloud-based pull-printing function and a cloud-based scanning function so that the electronic equipment performs the cloud-based pull-printing function and the cloud-based scanning function by using the tenant that is associated with the electronic equipment.

6. A non-transitory computer-readable storage medium having stored thereon an equipment program to be executed by electronic equipment that uses a tenant of a multi-tenant cloud server, the equipment program causes the electronic equipment to function to:

in response to input of tenant identification information to identify the tenant from a user, notify the cloud server of a query of access information to access the tenant, which includes the input tenant identification information, the access information being stored in the cloud server in association with the tenant identification information; and receive the access information notified from the cloud server in response to the query and access the tenant with the use of the received access information;

notify the tenant that has been accessed by the electronic equipment of an instruction for registering the electronic equipment, which includes authentication information of the user and the equipment identification information to specify the electronic equipment, to cause the equipment identification information included in the instruction to be stored in the tenant in accordance with authentication of the authentication information, and associate the electronic equipment with the tenant; and perform a cloud-based pull-printing function and a cloud-based scanning function, which are provided by the cloud server, by using the tenant that is associated with the electronic equipment.

* * * * *